United States Patent [19]

Uchida

[11] Patent Number: 4,461,798
[45] Date of Patent: Jul. 24, 1984

[54] METAL-REINFORED SYNTHETIC WOOD MATERIAL

[76] Inventor: Takeshi Uchida, c/o Nichimen Co., Ltd., 1-9 Doujimahama 2-chome, Osaka-shi, Osaka-fu, Japan

[21] Appl. No.: 420,824

[22] Filed: Sep. 21, 1982

[30] Foreign Application Priority Data

Sep. 21, 1981 [JP] Japan .......................... 56-140059[U]

[51] Int. Cl.$^3$ .......................... B32B 3/12; B32B 9/00
[52] U.S. Cl. .......................... 428/160; 428/159; 428/319.1; 428/179; 428/425.8; 428/408; 269/176 R
[58] Field of Search .................... 428/179, 408, 309.9, 428/425.8, 160, 159, 319.1

[56] References Cited

U.S. PATENT DOCUMENTS 3,063,498 11/1962 Ford .................................. 428/179
3,839,080 10/1983 Jarema et al. ..................... 428/309.9

Primary Examiner—P. Ives
Attorney, Agent, or Firm—Spensley, Horn, Jubas & Lubitz

[57] ABSTRACT

A metal-reinforced synthetic wood material which is composted of a metal assembly used for reinforcement, and synthetic resin for covering the metal assembly. The metal assembly is, for example, formed of a high-carbon special steel, and the synthetic resin is, for example, foamed polyurethane. This synthetic wood material is manufactured by a method, which method includes the steps of placing the metal assembly in a mold of a molding machine, and injecting the resin material into the mold in a reaction injection molding. Thus, the synthetic wood material having high moisture resistance and sufficient strength can be obtained.

7 Claims, 3 Drawing Figures

METAL-REINFORCED SYNTHETIC WOOD MATERIAL

BACKGROUND OF THE INVENTION

This invention relates to a metal-reinforced synthetic wood material and a method for manufacturing the material.

Heretofore, wood material is widely used not only for a building material but also for a loading bed for use in a refrigerating van, a truck or a container, and a scaffolding board in a construction site. When the wood material is used as a loading bed for the refrigerating van, the material is feasibly corroded due to moisture, resulting in a short lifetime. When the wood material is used as the loading bed, a product loaded on the loading bed is likely to be scratched by a fuzz or curly grains of the wood material. When the wood material is used for the scaffolding board, strength is not sufficient.

A synthetic wood material made of a fiber reinforced plastic (FRP) has been recently proposed. However, this wood material has a drawback that it is its expensive.

SUMMARY OF THE INVENTION

Accordingly, it is an object of the present invention to provide an inexpensive synthetic wood material capable of eliminating all the aforementioned drawbacks and disadvantages of the conventional wood material, and having high moisture resistance and sufficient strength, causing no damage to a product when the product contacts it, and a method for manufacturing the material.

According to the present invention, a metal-reinforced synthetic wood material is composed of a metal member constructed as a framework for reinforcement and synthetic resin for covering the metal member. The metal member is, for example, made of a high-carbon special steel which contains high carbon content, and the synthetic resin is, for example, foamed polyurethane.

The metal member is further constructed with a plurality of metal elements, which are coupled in space to each other. The metal element is, for example, a plate having a predetermined width and a predetermined thickness.

The metal member is formed of a plurality of lateral plates aligned in parallel with each other, and the lateral plates are coupled at least two positions with longitudinal plates. The coupling of the lateral plates to the longitudinal plates is performed in such a manner that each longitudinal plate is formed with recesses of the shape corresponding to the thickness of each lateral plate at the positions to be coupled with the lateral plates and the lateral plates are respectively engaged in the recesses of the longitudinal plate, or each lateral plate is formed with through holes at the positions to be coupled with the longitudinal plates and the longitudinal plates are respectively engaged with the holes of the lateral plate.

Moreover, there are provided at suitable positions in the metal member one or more holes, each having a diameter larger than the diameter of a clamping bolt for readily passing the clamping bolt.

The metal-reinforced synthetic wood material of the present invention is manufactured by the steps of placing the metal member constructed as a rib member in a mold of a molding machine, and injecting a synthetic resin material into the mold to perform a reaction injection molding.

A polyol and an isocyanate for forming a foamed polyurethane are used as the synthetic resin material.

BRIEF DESCRIPTION OF THE DRAWINGS

In the accompanying drawings.

DETAILED DESCRIPTION OF THE REFERRED EMBODIMENTS

Figure 1:
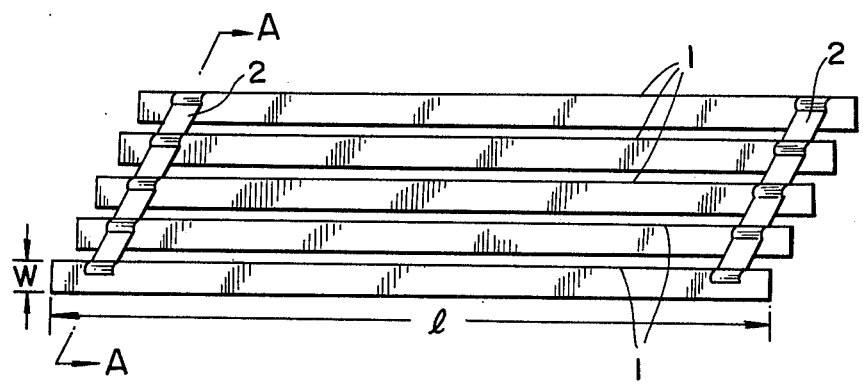
FIG. 1 is a perspective view illustrating a preferred embodiment of a framework of metal plates according to the present invention.

FIG. 1 shows a perspective view of a preferred embodiment of a framework of metal member according to the present invention. This framework consists of five lateral plates 1 and two longitudinal plates 2 for reinforcing the respective lateral plates 1 at both ends. Grooves of the shape having a width and a thickness corresponding to those of the longitudinal plate 2 are formed at arranged both ends of the respective lateral plates 1. The longitudinal plates 2 are respectively engaged with the grooves of the lateral plates 1 to reinforce the lateral plates 1 by holding the respective lateral plates 1. The material of the lateral and longitudinal plates 1 and 2 is a high-carbon special steel which contains high carbon content.

Figure 2:
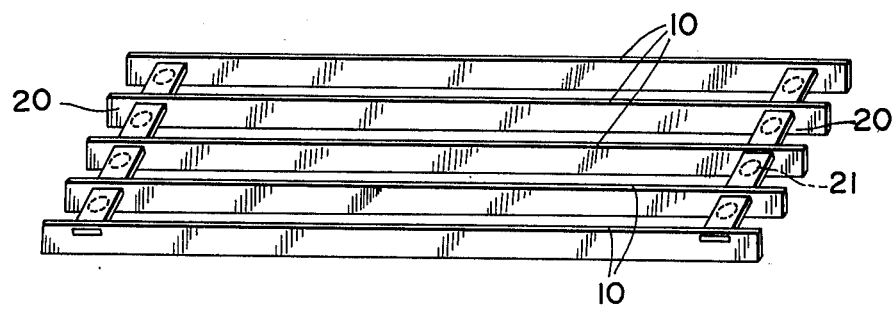
FIG. 2 is a perspective view showing another preferred embodiment of a framework of metal plates according to the present invention.

FIG. 2 is a perspective view illustrating another preferred embodiment of the framework of metal plates according to the present invention. In this embodiment, holes of the shape having a width and a thickness corresponding to those of a longitudinal plate 20 are formed at arranged both ends of respective lateral plates 10. The longitudinal plates 20 are respectively engaged with the holes of the lateral plates 10 to reinforce the lateral plates 10 by engaging the respective lateral plates 10. Bolt holes may be perforated in advance at the respective longitudinal plates 20 as shown by broken lines 21 in FIG. 2 so as to readily insert clamping bolts into synthetic wood material constructed with this framework. In this arrangement, it is preferred to form the bolt holes having a diameter sufficiently larger than that of the bolt used so as not to expose the longitudinal plates 20. It is noted that the bolt holes may also be formed similarly at the respective longitudinal plates 2 of the framework in FIG. 1.

The framework thus constructed is then placed in an injection mold (not shown).

When the framework is placed in the mold, a synthetic resin material for covering the framework is then injected into the mold. In this embodiment, since foamed polyurethane is employed as the synthetic resin, polyol and isocyanate are employed as the material to be injected into the mold. Thus, a polyaddition, foaming and crosslinking reactions take place with these materials in the mold, with the result that the framework is covered with the formed polyurethane which is cured by these reactions.

Figure 3:
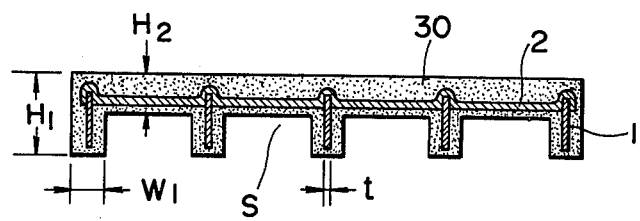
FIG. 3 is a sectional view of the metal-reinforced synthetic wood material according to the present invention.

FIG. 3 is a sectional view of the metal-reinforced urethane synthetic wood material thus produced as described above. In the drawing, the longitudinal plates 1 and 2 are as seen in a section along the line A—A in FIG. 1 and the framework is covered with the foamed polyurethane 30. In other words, the metal-reinforced urethane synthetic wood material is so constructed that the entire upper surface is a plane portion having a predetermined thickness of the foamed polyurethane 30, and under the lower surface between ribs of spaces S is formed. These spaces S serve as improved ventilation and drainage.

The physical properties of the metal-reinforced urethane synthetic wood material thus constructed will now be described.

To observe the physical properties of the metal-reinforced urethane synthetic wood material thus produced, material test was performed as follows:

The size of the synthetic wood material to be tested was:

L=820 mm, W=220 mm, H=18.3 mm where L represents its length, W represents its width, and H represents its height or mean thickness. The mean thickness H was obtained as the average of the height $H_1$ of the ribs and the thickness $H_2$ of the synthetic wood material at the spaces S, and the sizes of the ribs and the spaces of the material were:

$H_1$=30 mm, $W_1$=10 mm, $H_2$=14.85 mm where $H_1$ represents the height of each rib, $W_1$ represents the width of the rib, and $H_2$ represents the thickness at the space S (in FIG. 3).

The size of the lateral plate 1 was as follows:

l=800 mm, W=25 mm, t=1.6 mm where l represents the length, W represents the width and t represents the thickness, and the total weight of five lateral plates 1 was 1,240 g. The weight of two longitudinal plates 2 used at both ends of the lateral plates 1 was 155 g.

The weight of the polyol and isocyanate from which the foamed polyurethane is made was 1,230 g, and the specific weight of the foamed polyurethane was 0.394.

The relationship between loads and deflections of the metal-reinforced urethane synthetic wood material was listed in the following Table 1 in the case that the synthetic wood material was freely supported at a span of 600 mm between fulcra and a concentrated load was applied to the center of the material:

TABLE 1

| Load (kg) | 100 | 200 | 300 | 400 | 500 | 600 | 700 | 800 | 900 | 950 |
|---|---|---|---|---|---|---|---|---|---|---|
| Deflection (mm) | 2 | 4 | 6 | 8 | 10 | 12 | 14 | 17 | 18 | 20 |

As evident from the Table 1, the relationship between loads and deflections of the material are proportional up to 900 kg of the load. When the load exceeds 900 kg, the proportional relation between the loads and the deflections are destroyed. It is understood from this Table 1 that the elastic limit of the material is in the vicinity of 950 kg of the load. The Amsler testing machine used in this material test was able to apply load up to 1 ton, the fracture of the material could not be observed.

On the other hand, a comparison material (apitong plate) of the same dimensions as the above tested material was also tested using the same Amsler testing machine, and this comparison material was fractured at 850 to 900 kg of the load.

From these tests, it is understood that the metal-reinforced urethane wood material is stronger at the bending strength than the apitong plate.

Then, the metal-reinforced urethane synthetic wood material and comparison material (apitong plate) were performed for their impact strength tests. This tests employed a steel ball to be dropped having 101.2 kg in weight. The span of the material was 600 mm same to the above tests and its span height was 50 mm.

Table 2 lists the fracture states of the synthetic wood material and the apitong plate in terms of the dropping distances of the steel ball. The materials to be tested were employed for the equivalent materials used for the previous bending tests.

TABLE 2

| Tested materials | Synthetic wood material | Wood material (Apitong plate) |
|---|---|---|
| Dropping distance of steel ball and damaged state | | |
| 150 mm | Impact trace formed on upper surface. Almost no abnormality on back surface. | No abnormality on upper surface. One crack of approx. 100 mm on back surface. |
| 200 mm | | No abnormality on upper surface. A longitudinal crack produced on back surface. |
| 250 mm | A crack produced along reinforcement-metal on upper surface. six small cracks produced on back surface. | No abnormality on upper surface. Cut state observed on impacted back surface. |
| 300 mm | | No abnormality existed on upper surface. Small bent in cut state observed on back surface. |
| 500 mm | A longitudinal crack produced on surface. Numerous small cracks observed on impacted portion. | No abnormality existed on upper surface. Completely cut and greatly bent on back surface. |
| 1000 mm | Cracks produced along reinforcement-metal. Small bent observed. | |

As apparent from the above Table 2, the impact strength of the synthetic wood material of the present invention is larger than the conventional apitong plate.

Further, the synthetic wood material of the present invention has following advantages as compared with the conventional apitong plate:

(1) Extremely small water absorption rate, causing no corrosion

Water absorption rates

Synthetic wood material: 0.01 mg/cm$^3$ or less

Apitong plate: 80 to 100 mg/cm$^3$

Thus, since the synthetic wood material is a material having independent air foams, it absorbs almost no water.

(2) Small thermal conduction rate with excellent heat insulation

Thermal conductivity

Synthetic wood material: 0.03 to 0.04 kcal/m.hr.°C.

Apitong plate: 0.08 to 0.10 kcal/m.hr.°C.

(3) Excellent dimensional stability

Since the synthetic wood material has small linear expansion coefficient and does not absorb moisture nor suffers dryness, it exhibits almost no elongation, contraction, deflection, bending. Further, the synthetic wood material indicates no physical changes with temperature in the range of −50° C. to 70° C., and almost no change in the physical properties even at temperature in the range of −50° C. to 70° C. and 70° C. to 100° C.

(4) Stable supply of products with uniform quality is ensured

The synthetic wood material does not have irregularity in quality such as nodes nor and holes as exhibited in natural materials, and products of high quality can be stably supplied to consumers.

(5) Products of various shapes can be produced through molding

The synthetic wood material can be readily drilled, machined, nailed, perforated, adhered, bonded, and coated.

Though this synthetic wood material is more expensive (approx. 20 to 40% more expensive than the apitong plate at present), the synthetic wood material of the present invention has excellent strength as compared with the conventional synthetic resin polywood. It is less expensive than the FRP by approx. 30 to 50%.

It is noted that the framework of the metal member used in the metal-reinforced synthetic wood material is not limited only to the embodiments described above. Various other configuration may be adopted within the spirit and scope of the present invention.

What is claimed is:

1. A metal-reinforced synthetic wood structure comprising:
    a metal assembly for reinforcement, said metal assembly having a plurality of elongated lateral metal plates aligned in parallel with each other, said lateral plates being coupled at least at two positions with longitudinal plates; and
    a synthetic resin covering for said metal assembly, the entire upper surface of said covering being a planar portion of predetermined thickness, portions of said lateral plates depending downwardly below said planar portion and being surrounded by resin of said covering to form parallel spaced ribs.

2. A metal-reinforced synthetic wood structure as defined in claim 1, wherein said metal structure is formed of carbon steel plates.

3. A metal-reinforced synthetic wood structure as defined in claim 1, wherein said synthetic resin is a foamed polyurethane.

4. A metal-reinforced synthetic wood structure as defined in claim 1, wherein each of said longitudinal plates has a recess of a depth corresponding to the thickness of said lateral plate at the position to be coupled with said lateral plate, and the lateral plates are engaged with the recesses of said longitudinal plates, thereby coupling the lateral plates with the longitudinal plates.

5. A metal-reinforced synthetic wood structure as defined in claim 1, wherein each of said lateral plates has a through hole at the position to be coupled with the longitudinal plates, and the longitudinal plates are engaged with the holes of said lateral plates, thereby coupling the longitudinal plates with the lateral plates.

6. A metal-reinforced synthetic wood structure as defined in claim 1, wherein said metal assembly has at least one hole, having a diameter larger than the diameter of a clamping bolt for passing said clamping bolt therethrough.

7. A metal-reinforced synthetic wood structure comprising:
    a metal lattice having plural generally spaced parallel elongated lateral metal bars connected by at least two longitudinal metal bars, the planar faces of said lateral bars being generally normal to a plane containing said longitudinal metal bars, said lateral bars extending below said plane to form spaced ribs, and
    a foamed polyurethane synthetic resin enclosing said lattice, the entire upper surface of said resin being a planar portion of predetermined thickness and enclosing said longitudinal bars and the upper portions of said lateral bars, said resin also individually surrounding the downwardly extending portions of said lateral bars so that said spaced ribs are resin enclosed.

* * * * *